(12) United States Patent
Cohen et al.

(10) Patent No.: US 8,949,264 B2
(45) Date of Patent: Feb. 3, 2015

(54) DISAMBIGUATING ASSOCIATIONS

(75) Inventors: Ira Cohen, Modiin (IL); Ohad Assulin, Neve Ilan (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 21 days.

(21) Appl. No.: 13/361,326

(22) Filed: Jan. 30, 2012

(65) Prior Publication Data

US 2013/0198219 A1   Aug. 1, 2013

(51) Int. Cl.
*G06F 17/30* (2006.01)

(52) U.S. Cl.
USPC .......................................... 707/760

(58) Field of Classification Search
CPC ................................... G06F 17/3043
See application file for complete search history.

(56) References Cited

U.S. PATENT DOCUMENTS

| | | | |
|---|---|---|---|
| 5,386,556 A | 1/1995 | Hedin et al. | |
| 7,640,254 B2 * | 12/2009 | McConnell | 1/1 |
| 7,912,849 B2 | 3/2011 | Ohm et al. | |
| 2011/0025516 A1 | 2/2011 | Johnson et al. | |
| 2011/0314010 A1 * | 12/2011 | Ganti et al. | 707/728 |

OTHER PUBLICATIONS

Semantic Mapping Between Natural Language Questions and SQL Queries via Syntactic Pairing. Giordani, A. et al., 2010. http://disi.unitn.it/moschitti/articles/NLDB09.pdf. On pp. 207-221; vol. 5723.
Syntactic Structural Kemels for Natural Language Interfaces to Databases, Giordani, A. et al, University of Trento, 2009, http://livingknowledge.europarchive.org/images/publications/PKDD09.pdf >On pp. 391-406.
Assulin et al., U.S. Appl. No. 13/629,885 entitled Responding to Natural Language Queries filed Sep. 28, 2012 (21 pages).

* cited by examiner

*Primary Examiner* — Hung Q Pham

(57) ABSTRACT

Disclosed herein is a technique for disambiguating associations between one keyword and multiple attributes of a database model and for disambiguating associations between one attribute of a database model and multiple attribute types.

24 Claims, 5 Drawing Sheets

300

ACCESS ASSOCIATIONS BETWEEN KEYWORDS AND ATTRIBUTES OF DATABASE MODEL
302

↓

ACCESS THE CONTEXT FREE GRAMMAR
304

↓

RESPOND TO NEWLY RECEIVED NATURAL LANGUAGE QUERY
306

400

| | ID | Street | ZIP Code | City / MARY |
|---|---|---|---|---|
| | 402 | 404 | 406 | 408 |
| 410 | 1333 | 1913 Hanoi Street | 03310 | NEW CITY |

414

| | Cust. ID | First Name | Last Name | Age | Birthday / Customer |
|---|---|---|---|---|---|
| | 416 | 418 | 420 | 422 | 424 |
| 426 | 1501 | Mary | Smith | 34 | 1/1/1977 |

430

| | Staff ID | First Name | Last Name | Title | Start Date / EMPLOYEE |
|---|---|---|---|---|---|
| | 428 | 432 | 434 | 436 | 438 |
| 440 | 1333 | Mary | Jones | CLERK | 2/1/2009 |

| | KEYWORD (442) | DATABASE ATTRIBUTES (444) |
|---|---|---|
| 446 | MARY | CUSTOMER.FIRST_NAME |
| 448 | MARY | EMPLOYEE.FIRST_NAME |
| 450 | MARY | MARY |
| 452 | LAST NAME | CUSTOMER.LAST_NAME |
| 454 | LAST NAME | EMPLOYEE.LAST_NAME |
| 456 | STREET | MARY.STREET |

*Fig. 4B*

DISAMBIGUATING ASSOCIATIONS

BACKGROUND

Natural language interfaces may be utilized to translate questions written in a natural language into a suitable database query language, such as structured query language ("SQL"). In turn, a database management system may return the results of the query to a user. Such translation may be carried out using a semantic model that defines how the data is arranged in the database. The semantic model may comprise associations between certain keywords and database attributes (e.g., customer or employee.). In turn, the database attributes may be associated with a database property type (e.g., table or column). These associations of the semantic model may be adjusted to reflect changes in the underlying database model.

By way of example, a user may enter "What is the salary of the employee Mary?" "Mary" may be the value of a column termed "FIRST_NAME" in a record of a database table termed "EMPLOYEE." The semantic data model may include an association between the keyword "Mary" and the string "EMPLOYEE.FIRST_NAME." In turn, the string "EMPLOYEE.FIRST_NAME" may be associated with a string "VALUE" that represents a database property type. These associations may notify suitable translation software that a column termed "FIRST_NAME" whose value is "Mary" exists in a record of a table called "EMPLOYEE." The keyword "Salary" may be associated with the string "EMPLOYEE.SALARY." In turn, the string "EMPLOYEE.SALARY" may be associated with the string "COLUMN." These latter associations may notify suitable translation software that a column named "SALARY" exists in a database table named "EMPLOYEE." The foregoing associations may be used to construct expressions of a database language query.

BRIEF DESCRIPTION OF THE DRAWINGS

FIG. 4A is an example of a data base model.

FIG. 4B is an example of associations that reflect an illustrative database model.

DETAILED DESCRIPTION

Introduction: As noted above, associations stored in semantic models may be used to translate natural language queries into database queries. However, there are many associations that may be ambiguous. For example, "Mary" may be associated with "EMPLOYEE.FIRST_NAME," but "Mary" may also be the first name of a customer whose data is stored in a table termed "CUSTOMER." Thus, "Mary" may also be associated with the string "CUSTOMER.FIRST_NAME." While "SALARY" may be the name of a column in the table named "EMPLOYEE," a database may also contain a table named "SALARY." Therefore, the keyword "SALARY" may be associated with more than one database type, "COLUMN" or "TABLE." Translating an incoming natural language query into a corresponding database query may be difficult, when there are many ambiguous associations in the database model. Such ambiguity may result in erroneous responses to incoming queries.

In view of the foregoing, aspects of the present disclosure provide techniques for disambiguating associations between one keyword and multiple attributes of the database model. In a further aspect, a context free grammar may be utilized to disambiguate associations between one attribute of the database model and multiple attribute types. The aspects, features and advantages of the disclosure will be appreciated when considered with reference to the following description of examples and accompanying figures. The following description does not limit the disclosure; rather, the scope of the disclosure is defined by the appended claims and equivalents. The present disclosure is broken into sections. The first section, labeled "Environment," describes an illustrative environment in which various examples may be implemented. The second section, labeled "Components," describes various physical and logical components for implementing various examples. The third section, labeled "Operation," describes illustrative processes in accordance with aspects of the present disclosure.

Figure 1:
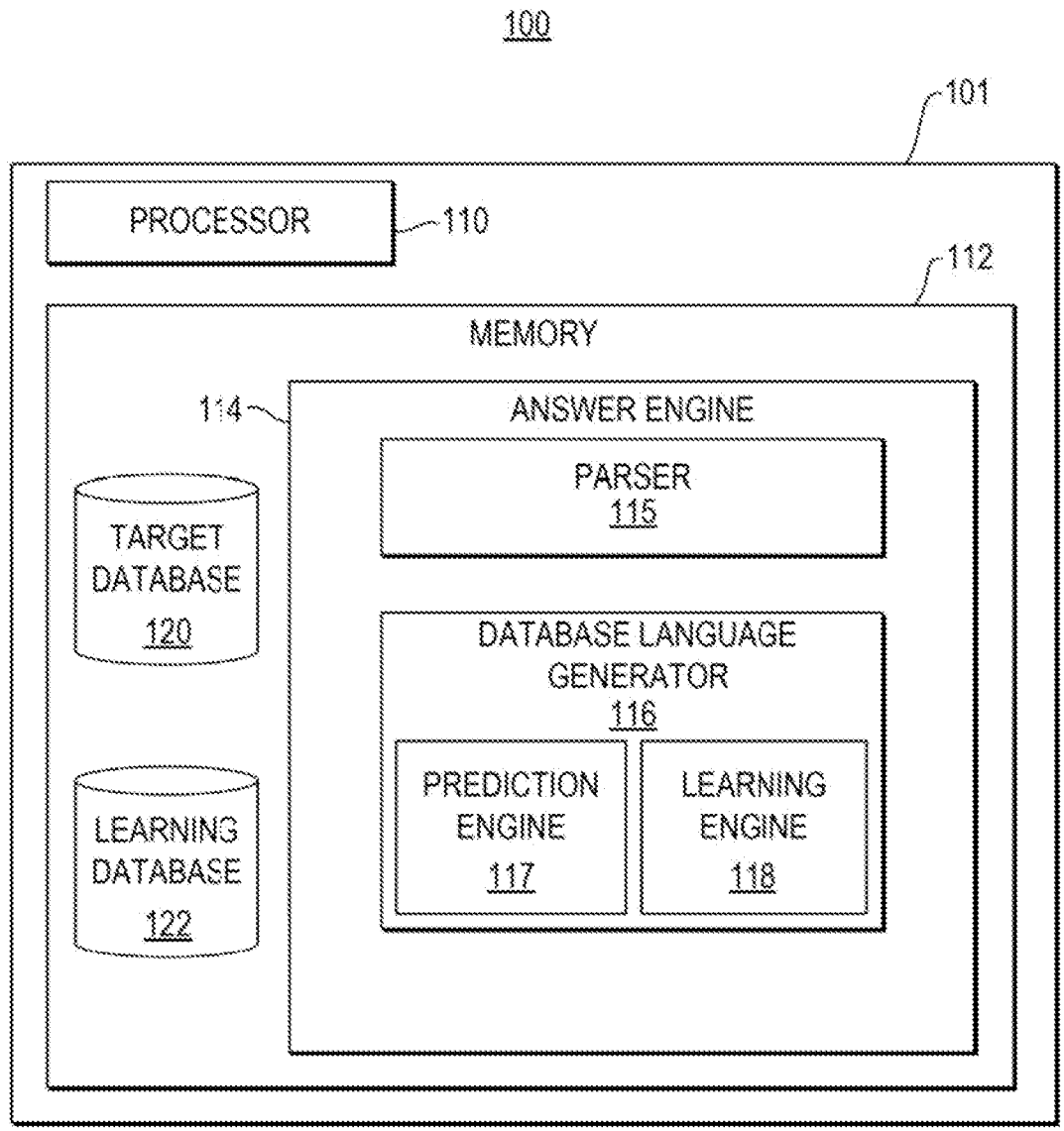
FIG. 1 is an illustrative system in accordance with aspects of the disclosure.

Environment: FIG. 1 presents a schematic diagram of an illustrative system 100 depicting a computer apparatus 101. Computer apparatus 101 may comprise any device capable of processing instructions and transmitting data to and from other computers, including a laptop, a full-sized personal computer, a high-end server, or a network computer lacking local storage capability. Moreover, computer apparatus 101 may comprise a mobile device capable of wirelessly exchanging data with a server, such as a mobile phone, a wireless-enabled PDA, or a tablet PC. Computer apparatus 101 may include all the components normally used in connection with a computer. For example, it may have a keyboard, a mouse and/or various other types of input devices such as pen-inputs, joysticks, buttons, touch screens, etc., as well as a display, which could include, for instance, a CRT, LCD, plasma screen monitor, TV, projector, etc.

Computer 101 may be at one node of a network, which may be a local area network ("LAN"), wide area network ("WAN"), the Internet, etc. Such a network and intervening computer devices thereof may also use various protocols including virtual private networks, local Ethernet networks, private networks using communication protocols proprietary to one or more companies, cellular and wireless networks, instant messaging, HTTP and SMTP, and various combinations of the foregoing.

Components: Memory 112 may store answer engine instructions 114, which may be retrieved and executed by processor 110. In one example, memory 112 may be a random access memory ("RAM") device. Alternatively, memory 112 may comprise other types of devices, such as memory provided on floppy disk drives, tapes, and hard disk drives, or other storage devices that may be directly or indirectly coupled to computer apparatus 101. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC"). Although FIG. 1 functionally illustrates the processor 110 and memory 112 as being within the same block, it will be understood that the processor and memory may actually comprise at least one or multiple processors and memories that may or may not be stored within the same physical housing. For example, any one of the memories may be a hard drive or other storage media located in a server farm of a data center. Accordingly, references to a processor, computer, or memory will be understood to include references to a collection of processors, computers, or memories that may or may not operate in parallel.

Memory 112 may also store target database 120 and learning database 122. The data stored in these databases may be retrieved, stored, or modified by processor 110. Target database 120 may include information that may be relevant to incoming natural language queries. Learning database 122 may include associations between keywords and attributes of the database model that reflect the arrangement of target database 120. Such associations may be adaptable for disambiguating associations between one keyword and multiple attributes of the database model. Learning database 122 may also include data associated with a context free grammar that may be adaptable for disambiguating associations between one, attribute of the database model and multiple attribute types. Furthermore, learning database 122 may contain historical data associated with previously received natural language queries. Such historical data may be used to learn how to translate natural language queries into database language queries. The historical data may also contain observation data. The observation data may include a subset of associations between keywords and database attributes and a subset of sentences of the context free grammar. The associations and sentences set aside in the observation data may have translated into at least one expression of a database query that produced a correct answer to a previously received natural language query.

Although the architecture of target database 120 and learning database 122 are not limited by any particular database structure or product, the data may be stored in computer registers, in a relational database as tables having a plurality of different columns and records, XML documents or flat files. The data may comprise any information sufficient to identify the relevant data, such as numbers, descriptive text, proprietary codes, references to data stored in other areas of the same memory or different memories (including other network locations) or information that is used by a function to calculate the relevant data.

Computer apparatus 101 may be configured as a database server. In this regard, computer apparatus 101 may be capable of communicating data with a client computer such that computer apparatus 101 uses a network to transmit information for presentation to a user of a remote computer. Accordingly, computer apparatus 101 may be used to obtain database information for display via, for example, a web browser executing on a remote computer. Computer apparatus 101 may also comprise a plurality of computers, such as a load balancing network, that exchange information with different computers of a network for the purpose of receiving, processing, and transmitting data to multiple client computers. In this instance, the client computers will typically still be at different nodes of the network than any of the computers comprising computer apparatus 101.

Answer engine instructions 114 may comprise any set of instructions to be executed directly (such as machine code) or indirectly (such as scripts) by the processor(s). In that regard, the terms "instructions," "modules" and "programs" may be used interchangeably herein. The instructions may be stored in any computer language or format, such as in object code or modules of source code. Furthermore, it is understood that the instructions may be implemented in the form of hardware, software, or a combination of hardware and software and that the examples herein are merely illustrative. Functions, methods and routines of answer engine instructions 114 are explained in more detail below.

In one example, answer engine instructions 114 may be realized in any non-transitory computer-readable media for use by or in connection with an instruction execution system such as computer apparatus 101, an ASIC or other system that can fetch or obtain the logic from non-transitory computer-readable media and execute the instructions contained therein. "Non-transitory computer-readable media" may be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

FIG. 1 also shows illustrative modules of answer engine instructions 114. Parser 115 may instruct a processor to parse the incoming natural language query so as to detect keywords therein that are associated with attributes of the database model. Database language generator 116 may instruct a processor to translate a natural language query into a database language query and to transmit a response. The database language generator 116 may include a prediction engine 117 that determines the best answers to new natural language queries. Database language generator 116 may also include a learning engine 118 that may learn to translate natural language queries into database language queries using historical data associated with previously received natural language queries. Parser 115 may also detect words in new natural language queries that are defined in a context free grammar generated by learning engine 118.

Figure 2:
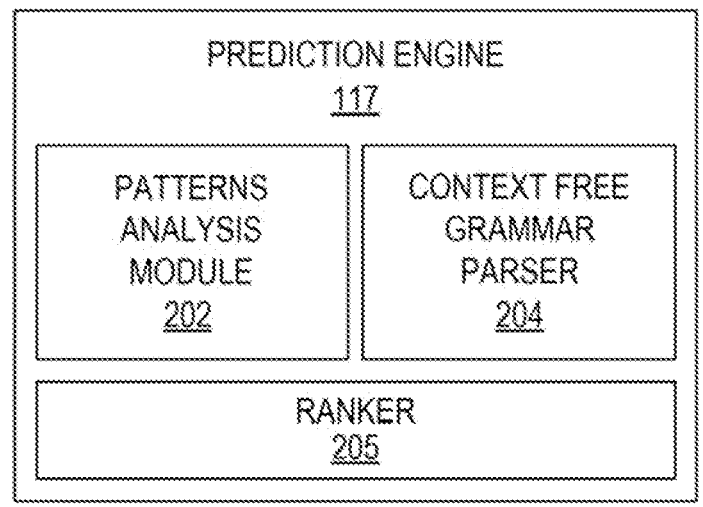
FIG. 2 is an example of modules in accordance with aspects of the disclosure.
Figure 2:
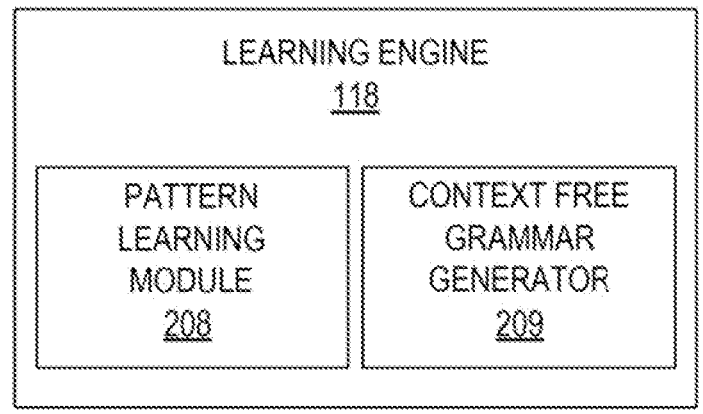

FIG. 2 shows illustrative modules within prediction engine 117 and learning algorithm 118. Prediction engine 117 may include a patterns analysis module 202 and a context free grammar parser 204. Patterns analysis module 202 may be used to rank associations between keywords in new natural language queries and attributes of the database model. Such ranking may be based on a probability that each association will translate into at least one expression of a database query that produces a correct answer to a new natural language query. The context free grammar parser 204 may analyze words in a new incoming natural language query and rank sentences of the context free grammar containing at least one keyword also contained in the new natural language query. In one example, the context free grammar may be a stochastic or probabilistic context free grammar such that a probability associated with each sentence thereof reflects the relative frequency with which the sentence translated into at least one expression of a database query that produced a correct answer to a previously received natural language query. In a further example, context free grammar parser 204 may use the Cocke-Younger-Kasami ("CYK") algorithm to rank the relevant sentences of the context free grammar. As will be discussed in more detail further below, ranking module 205 may be used to combine the rankings of the associations and the sentences so as to generate a final ranking score for each combination of rankings.

Learning engine 118 may comprise a pattern learning module 208. Pattern learning module 208 may generate the aforementioned probabilities for associations between keywords and database attributes used by patterns analyses module 202. The probabilities assigned to each association may reflect the relative frequency with which the association translated into at least one expression of a database query that produced a correct answer to a previously received natural language query. Context free grammar generator 209 may generate rules and sentences of a context free grammar based on previously received natural language queries. As noted above, the context free grammar may be adaptable for disambiguating associations between one attribute of the database model and multiple database attribute types. Each symbol of the context free grammar may be a word contained in a previously received natural language query. These symbols may be terminal symbols of the context free grammar. Terminal symbols may be words that cannot be broken down into or replaced by other symbols. However, keywords in former natural language queries that are associated with a database attribute may be non-terminal symbols. Such non-terminal symbols or keywords may be replaced in a sentence of the context free grammar with a database attribute type that corresponds to the attribute of the database model associated with the keyword. The terminal and non-terminal symbols of the context free grammar will be discussed in more detail further below. In one example, context free grammar generator 209 may use the inside/outside algorithm to construct sentences in the context free grammar and assign probabilities thereto.

Figure 3:
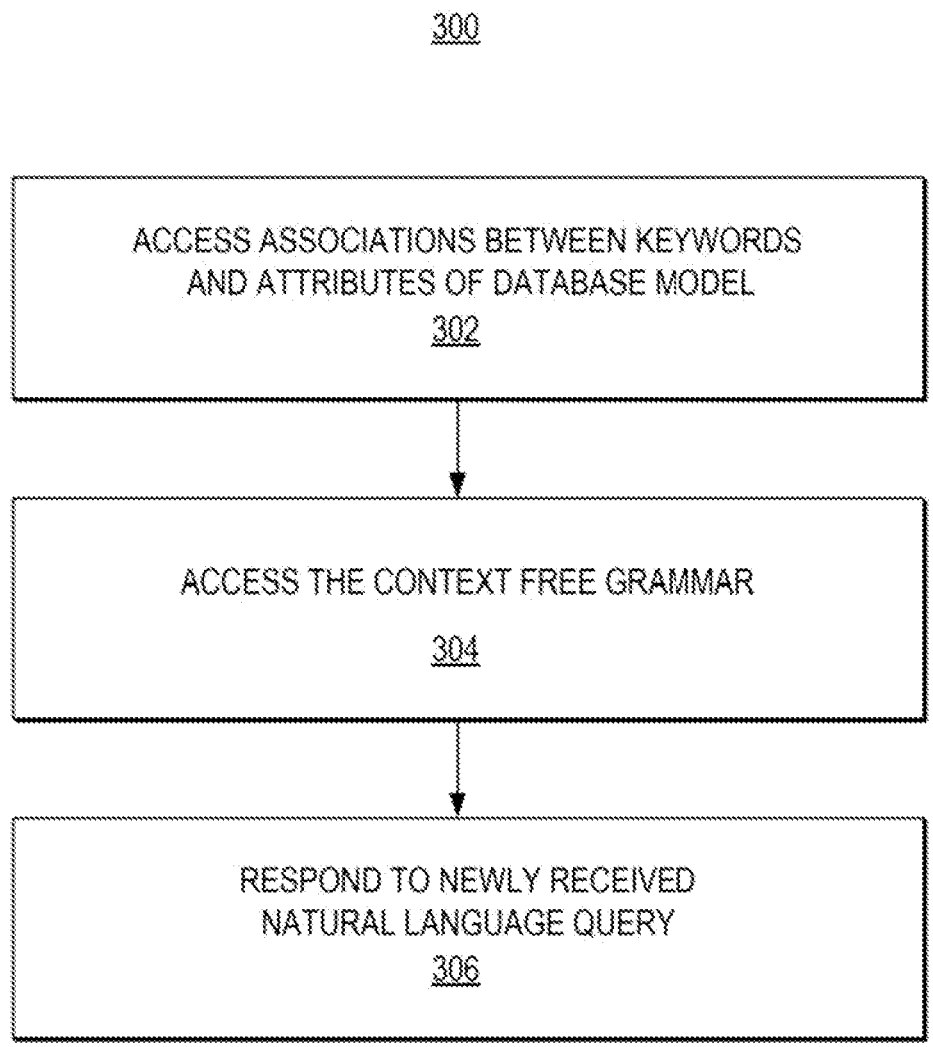
FIG. 3 is an example of a flow diagram in accordance with aspects of the disclosure.
Figure 5:
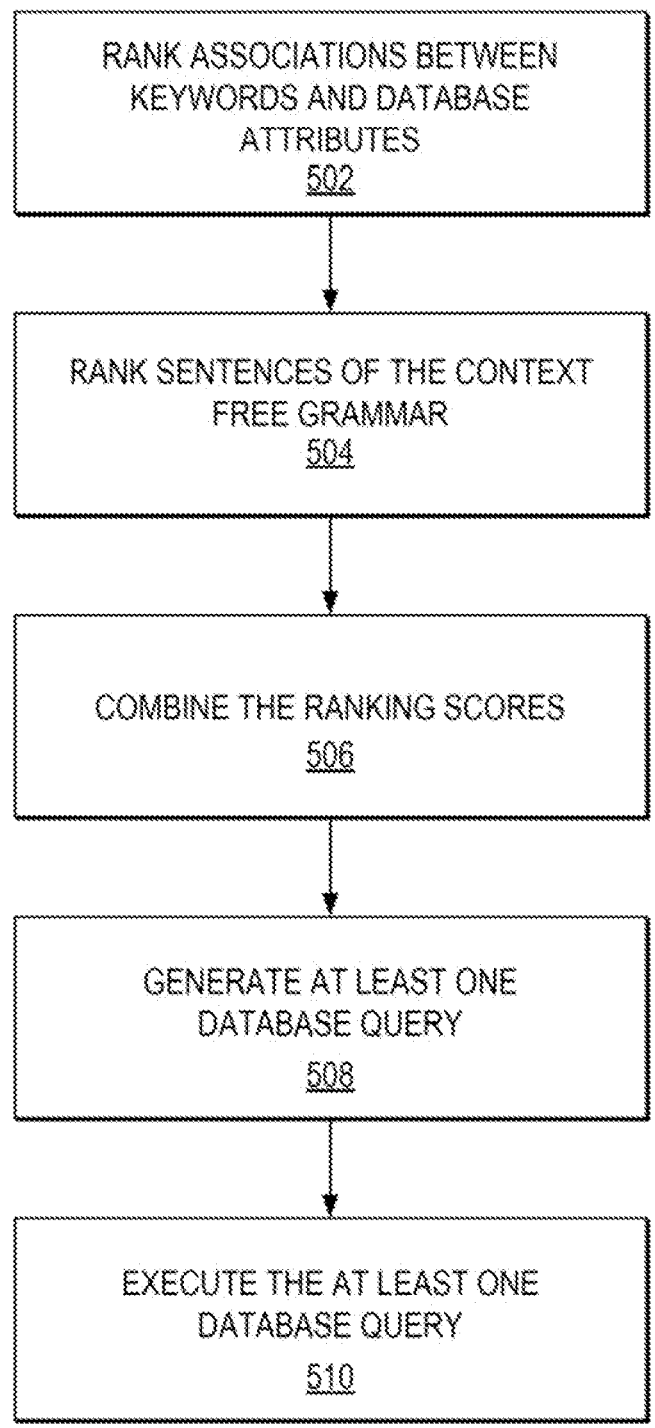
FIG. 5 is another example of a flow diagram in accordance with aspects of the disclosure.

Operation: One working example of a system and method to process natural language queries is illustrated in FIGS. 3-5. In particular, FIGS. 3 and 5 illustrate flow diagrams in accordance with aspects of the present disclosure. FIGS. 4A-B show various aspects of natural language processing in accordance with the present disclosure. The actions shown in FIGS. 4A-B will be discussed below with regard to the flow diagrams of FIGS. 3 and 5.

As shown in block 302 of FIG. 3, associations between keywords contained in formerly received natural language queries and attributes of the database model may be accessed. As noted above, these associations may be utilized to disambiguate associations between one keyword and multiple attributes of the database model.

Referring to. FIG. 4A, a simple, illustrative database model of target database 120 is shown. Mary table 400 may store information associated with an employee named Mary. Mary table 400 is shown having an identifier column 402, a street column 404, a zip code column 406, and a city column 408. Mary table 400 is shown having one record of data, record 410. The data of record 410 may comprise a value of 1333 in identifier column 402, a value of "1913 Hanoi Street" in street column 404, a value of "03310" in zip code column 406, and a value of "New City" in city column 408.

Customer table 414 may be utilized to store customer data of a business. Customer table 414 may have a customer identifier column 416, a first name column 418, a last name column 420, an age column 422, and a birthday column 424. Customer table may have one record of data 426 comprising a value of 1501 in customer identifier column 416, a value of "Mary" in first name column 418, a value of "Smith" in last name column 420, a value of 34 in age column 422, and a value of "1/1/1977" in birthday column 424.

Employee table 430 may be used to store employee data of a business. Employee table 430 may have a staff identifier column 428, a first name column 432, a last name column 434, a title column 436, and a start date column 438. Employee table 430 may also have one record of data, record 440, comprising a value of 1333 in staff identifier column 428, a value of "Mary" in first name column 432, a value of "Jones" in last name column 434, a value of "Clerk" in title column 436, and a value of "2/1/2009" in start date column 438. The value 1333 stored in staff identifier column 428 of employee table 430 may be used to associate record 440 with record 410 of Mary table 400, which also contains 1333 in identifier column 402.

FIG. 4B shows illustrative associations 443 containing associations between keywords 442 and attributes 444. Associations 443 may reflect part of the database model shown in FIG. 4A for illustrative purposes. Associations 446, 448, and 450 are associations between one keyword, "Mary," and multiple attributes of the database model, namely "CUSTOMER. FIRST_NAME," "EMPLOYEE.FIRST_NAME," and "MARY" respectively. Associations 452 and 454 are associations between the keyword "last name" and the database attributes "CUSTOMER.LAST_NAME" and "EMPLOYEE.LAST_NAME" respectively. Finally; association 456 is an association between the keyword "STREET" and the database attribute "MARY.STREET."

Referring back to FIG. 3, a context free grammar may be accessed, as shown in block 304. As noted above, context free grammar generator 209 may produce a context free grammar comprising words from formerly received natural language queries. These words may be used to construct sentences in accordance with rules determined by context free grammar generator 209. These sentences may be compared to incoming natural language queries. By way of example, the following natural language queries may have been the only ones received in the past:

"What is Mary's last name?"

"What street does Mary live on?"

In view of the two natural language queries above, context free grammar generator 209 may include the following symbols in the grammar: "What," "is," "Mary," "last name," "street," "does," "live," and "on." The symbols "What," "is," "does," "live," and "on" may be terminal symbols that cannot be broken down into or replaced by other symbols, when a sentence including those symbols is constructed. However, the symbols "Mary," "last name," and "street" are keywords associated with database attributes as shown in FIG. 4B. Therefore, context free grammar generator 209 may establish a rule requiring these symbols to be non-terminal symbols that may be replaced in a sentence with other symbols. The rule may further require such non-terminal symbols be replaced with labels describing database attribute types that correspond to the database attribute associated with the non-terminal symbol or keyword. The database attribute types may correspond to the database attributes associated with the non-terminal symbols or key words. The possible labels may be "TABLE," "COLUMN," or "VALUE." Therefore, the sentences of the context free grammar may comprise any formerly received natural language query in which the keywords therein that are associated with database attributes are replaced with labels of database attribute types corresponding to the database attributes. As shown in FIGS. 4A-4B,. "Mary" may be the value of the "FIRST_NAME" column of the "CUSTOMER" table or the "FIRST_NAME" column of the "EMPLOYEE" table. In addition, "Mary" may be the name of a separate table, Mary table 400. Therefore, any sentence in the context free grammar that originally contained the keyword "Mary" may be replaced with the labels "TABLE" or "VALUE."

Referring back to FIG. 3, a response to a newly received natural language query may be generated, as shown in block 306. By way of example, the newly received natural language query may be "What is Mary's last name?" As noted above, in this example, "What is Mary's last name?" and "What street does Mary live on" are the only two queries that have been received in the past. The new incoming query "What is Mary's last name" contains some terminal symbols and non-terminal symbols of the illustrative context free grammar described above. The incoming natural language query may have two possible corresponding sentences in the context free grammar: "What is VALUE COLUMN" or "What is TABLE COLUMN." In the first corresponding sentence, the non-terminal symbols "Mary" and "last name" are replaced with the database type labels "VALUE" and "COLUMN" respectively. In the second corresponding sentence, the non-terminal symbols "Mary" and "last name" are replaced with the database type labels "TABLE" and "COLUMN" respectively. The sentences account for the two possible data base attribute types that may be associated with "Mary," a database table or a database column. Each sentence of the context free grammar may be associated with a probability representing the likelihood that the sentence will translate into at least one expression of the database query that produces the correct result to the newly received query.

FIG. 5 is a further illustrative process 500 in accordance with aspects of the present disclosure. As shown in block 502, associations between keywords and database attributes may be ranked. Each association between a keyword contained in the new natural language query and an attribute of the database model may be associated with a first probability. The first probability may represent a likelihood that each association will translate into at least one expression of a database query that produces a correct answer to the new natural language query. Referring back to FIG. 4B, each of the associations 446-454 may be ranked in accordance with their respective probabilities so as to assign a first ranking score thereto. Associations 446-454 are the only associations relevant to the new natural language query, "What is Mary's last name." By way of example, it may be determined that association 448 of FIG. 4B contributed to the correct answer to 8 out of 10 previous natural language queries, while association 446 may have only contributed to the correct answer to 2 out of 10 previous natural language queries.

Referring back to FIG. 5, sentences of the context free grammar may be ranked, as shown in block 504. The relevant sentences may contain at least one keyword also contained in the new natural language query. Each sentence may be associated with a second probability. The second probability may represent the likelihood that each sentence containing at least one keyword also contained in the new natural language query will translate into at least one expression of the database query that produces a correct answer to the new natural language query. In the current example, the two context free grammar sentences that contain at least one keyword also contained in the new natural language query are: "What is Mary's last name?" and "What street does Mary live on?" After replacing the non-terminal symbols with their respective terminal symbols or labels, the sentences become: "What is VALUE COLUMN" and "What is TABLE COLUMN." As with the associations in FIG. 4B, the sentences may be ranked in accordance with their respective probabilities. For example, it may be determined that "What is VALUE COLUMN" contributed to the correct answer to 9 out of 10 previous natural language queries, while "What is TABLE COLUMN" contributed to the correct answer to only 1 out of 10 previous natural language queries.

Referring back to FIG. 5, the ranking scores of the associations and the context free grammar may be combined, as shown in block 506. Each first ranking score and each second ranking score may be combined so as to generate a final ranking score for each combination of first ranking score and second ranking score. As shown in block 508, at least one database query may be generated. In block 510, the at least one database query may be executed. The expressions of the first database query may include attributes of the database model and attribute types associated therewith that correspond to the final ranking score. Additional database language queries may be generated and executed in an order that coincides with the final ranking score for each combination of ranking scores. For example, the probability of association 448 and 454 of FIG. 4B may be combined with the probability of the sentence "What is VALUE COLUMN." This combination may translate into a query against the EMPLOYEE table. Association 448 specifies that "Mary" is associated with the "FIRST_NAME" column of the "EMPLOYEE" table. Association 452 specifies that last name is associated with the "LAST_NAME" column of the "EMPLOYEE" table. The sentence "What is VALUE COLUMN" specifies that the attribute associated with "Mary is a "VALUE" type and that the attribute associated with "last name" is a "COLUMN" type. The following SQL query may be generated in view of the foregoing:

SELECT LAST_NAME
from EMPLOYEE
where EMPLOYEE.FIRST_NAME="Mary"

The query above may be the first database query generated and executed, which would return the value "Jones" to the user who submitted the natural language query. Additional queries with lower ranked expression may be generated and executed so as to return a plurality of results. In one example, all the results may be displayed so as to allow the user to select the correct result. The system may record the associations and sentences that contributed to the correct result as observation data for future analyses.

Conclusion: Advantageously, the above-described system and method disambiguates associations of a database model that may be interpreted in various ways. In this regard, the likelihood of producing accurate answers to natural language queries is enhanced and users can be rest assured that the responses they receive are reliable.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently, and steps may be added or omitted.

The invention claimed is:
1. A system comprising:
at least one processor to:
access associations between keywords contained in formerly received natural language queries and attributes of a database model;
access a context free grammar comprising a first sentence that includes elements of a formerly received natural language query, wherein in the first sentence a given keyword in the formerly received natural language query that is associated with an attribute of the database model is replaced with a first label representing a first one of plural different database attribute types of the attributes of the database model;
disambiguate first associations between a first keyword and multiple attributes of the database model;

disambiguate second associations between an attribute of the database model and the plural different database attribute types using the context free grammar; and respond to a new natural language query by generating a database language query based on the disambiguating of the first and second associations.

2. The system of claim 1, wherein the context free grammar further includes a second sentence including the elements of the formerly received natural language query, the second sentence including a second label that replaces the given keyword in the formerly received natural language query, the second label representing a second, different one of the plural different database attribute types.

3. The system of claim 2, wherein generating the database language query is further based on rankings associated with the first and second sentences, the rankings corresponding to likelihoods that respective ones of the first and second sentences will translate into respective expressions of the database language query that produce a correct answer to the new natural language query.

4. A system comprising:
at least one processor to:
learn to translate natural language queries into database language queries using historical data associated with previously received natural language queries;
respond to a new natural language query based on an analysis of the historical data, the historical data comprising:
associations between keywords contained in the previously received natural language queries and attributes of a database model, the associations including associations between a first of the keywords and multiple attributes of the database model; and
a context free grammar, the context free grammar being adaptable for disambiguating associations between an attribute of the database model and multiple attribute types, the multiple attribute types comprising a database table, a database column, and a value in a database table, the context free grammar further comprising a sentence including elements of a formerly received natural language query, and including a label replacing a given keyword in the formerly received natural language query and representing one of the database attribute types, the one database attribute type corresponding to the attribute of the database model associated with the given keyword; and
associate a given association between a keyword in the new natural language query and a respective attribute of the database model with a first probability, the first probability representing a likelihood that the given association will translate into at least one expression of a database language query that produces a correct answer to the new natural language query.

5. The system of claim 4, wherein the at least one processor is to associate the sentence with a second probability, the second probability representing a likelihood that the sentence will translate into at least one expression of the database language query that produces the correct answer to the new natural language query.

6. The system of claim 5, wherein the at least one processor is to further assign a first ranking score to the given association between the keyword in the new natural language query and the respective attribute of the database model based on the first probability.

7. The system of claim 6, wherein the at least one processor is to further assign a second ranking score to the sentence based on the second probability.

8. The system of claim 7, wherein the at least one processor is to further:
generate a final ranking score for a combination of first ranking score and the second ranking score;
generate at least one database language query for the new natural language query such that expressions of the at least one database language query include attributes of the database model and attribute types associated with the database model that correspond to the final ranking score; and
execute the at least one database language query.

9. A non-transitory computer readable medium having instructions stored therein for causing at least one processor to:
access associations between keywords contained in formerly received natural language queries and attributes of a database model;
access a context free grammar comprising a first sentence that includes elements of a formerly received natural language query, wherein in the first sentence a given keyword in the formerly received natural language query that is associated with an attribute of the database model is replaced with a first label representing a first one of plural different database attribute types of the attributes of the database model;
disambiguate first associations between a first keyword and multiple attributes of the database model;
disambiguate second associations between an attribute of the database model and the plural different database attribute types using the context free grammar; and
respond to a new natural language query by generating a database language query based on the disambiguating of the first and second associations.

10. The non-transitory computer readable medium of claim 9, wherein the instructions are for further causing the at least one processor to assign a first probability to a given association between a keyword in the new natural language query and a respective attribute of the database model, the first probability representing a likelihood that the given association will translate into at least one expression of the database language query that produces a correct answer to the new natural language query.

11. The non-transitory computer readable medium of claim 10, wherein the instructions are for further causing the at least one processor to assign a second probability to the sentence of the context free grammar, the second probability representing the likelihood that the sentence will translate into at least one expression of the database language query that produces the correct answer to the new natural language query.

12. The non-transitory computer readable medium of claim 11, wherein the instructions are for further causing the at least one processor to assign a first ranking score to the given association between the keyword in the new natural language query and the respective attribute of the database model based on the first probability.

13. The non-transitory computer readable medium of claim 12, wherein the instructions are for further causing the at least one processor to assign a second ranking score to the sentence based on the second probability.

14. The non-transitory computer readable medium of claim 13, wherein the instructions are for further causing the at least one processor to:
generate a final ranking score for a combination of the first ranking score and the second ranking score;

generate the database language query such that expressions of the database language query include attributes of the database model and attribute types associated with the database model that correspond to the final ranking score; and execute the at least one database language query.

15. The non-transitory computer readable medium of claim 9, wherein the context free grammar further comprises a second sentence that includes the elements of the formerly received natural language query, wherein in the second sentence the given keyword in the formerly received natural language query is replaced with a second label representing a second, different one of the plural different database attribute types, and wherein responding to the new natural language query by generating the database language query is further based on accessing the context free grammar that includes the first and second sentences.

16. The non-transitory computer readable medium of claim 15, wherein the instructions are for further causing the at least one processor to assign probabilities to the first and second sentences, where the probabilities correspond to likelihoods that respective ones of the first and second sentences will translate into respective expressions of the database language query that produce a correct answer to the new natural language query.

17. The non-transitory computer readable medium of claim 9, wherein the plural different attribute types comprise a database table, a database column, and a value in a database table.

18. A method comprising:

accessing, by a system including a processor, associations between keywords contained in formerly received natural language queries and attributes of a database model;

accessing, by the system, a context free grammar including a first sentence containing elements of a given formerly received natural language query, the first sentence further containing a first label representing one of plural different database attribute types of the attributes of the database model, the first label replacing a given keyword in the given formerly received natural language query;

disambiguating, by the system, first associations between a first keyword and multiple attributes of the database models;

disambiguating, by the system, second associations between an attribute of the database model and the plural different database attribute types using the context free grammar; and generating, by the system, a database language query in response to a new natural language query, based on accessing the context free grammar and the disambiguating of the first and second associations.

19. The method of claim 18, further comprising:

assigning, by the system, a first probability to a given association between a keyword in the new natural language query and a respective attribute of the database model, the first probability representing a likelihood that the given association will translate into at least one expression of the database language query that produces a correct answer to the new natural language query.

20. The method of claim 19, further comprising:

assigning, by the system, a second probability to the first sentence of the context free grammar, the second probability representing the likelihood that the first sentence will translate into at least one expression of the database language query that produces the correct answer to the new natural language query.

21. The method of claim 20, further comprising:

assigning a first ranking score, by the system, to the given association between the keyword in the new natural language query and the respective attribute of the database model based on the first probability.

22. The method of claim 21, further comprising:

assigning a second ranking score, by the system, to the first sentence based on the second probability.

23. The method of claim 18, wherein accessing the context free grammar comprises accessing the context free grammar that further includes a second sentence containing elements of the given formerly received natural language query, the second sentence further containing a second label representing another one of the plural different database attribute types, the second label replacing the given keyword in the given formerly received natural language query.

24. The method of claim 18, wherein the plural different attribute types comprise a database table, a database column, and a value in a database table.

* * * * *